(12) United States Patent
Chen et al.

(10) Patent No.: US 10,563,338 B2
(45) Date of Patent: Feb. 18, 2020

(54) PERSONALIZED LAUNDRY APPLIANCE

(71) Applicant: MIDEA GROUP CO., LTD., Foshan (CN)

(72) Inventors: Xin Chen, Los Altos, CA (US); Hua Zhou, San Jose, CA (US); Yuxiang Gao, San Jose, CA (US); Yu Zhu, Milpitas, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 56 days.

(21) Appl. No.: 15/831,088

(22) Filed: Dec. 4, 2017

(65) Prior Publication Data

US 2019/0169780 A1    Jun. 6, 2019

(51) Int. Cl.
| | |
|---|---|
| D06F 39/00 | (2006.01) |
| D06F 33/02 | (2006.01) |
| D06F 58/28 | (2006.01) |
| G05B 13/02 | (2006.01) |
| D06F 23/04 | (2006.01) |
| D06F 39/14 | (2006.01) |

(52) U.S. Cl.
CPC ............ *D06F 39/003* (2013.01); *D06F 33/02* (2013.01); *D06F 58/28* (2013.01); *G05B 13/0265* (2013.01); *D06F 23/04* (2013.01); *D06F 39/14* (2013.01); *D06F 2058/2861* (2013.01); *D06F 2202/10* (2013.01); *D06F 2212/02* (2013.01)

(58) Field of Classification Search
CPC ........ D06F 39/003; D06F 33/02; D06F 58/28; D06F 2058/2861; G05B 13/0265
See application file for complete search history.

(56) References Cited

U.S. PATENT DOCUMENTS 9,476,156 B2    10/2016  Jung et al.
9,689,101 B2 *   6/2017  Alexander ............ D06F 39/004
(Continued)

FOREIGN PATENT DOCUMENTS

| CN | 106033195 A | 10/2016 |
|---|---|---|
| CN | 106854808 A | 6/2017 |
(Continued)

OTHER PUBLICATIONS

Midea Group Co. Ltd., International Search Report and Written Opinion, PCT/CN2018/115504, dated Feb. 26, 2019, 9 pgs.

*Primary Examiner* — Thomas C Lee
*Assistant Examiner* — Anzuman Sharmin
(74) *Attorney, Agent, or Firm* — Morgan, Lewis & Bockius LLP (57) ABSTRACT

Laundry appliances use machine learning models and/or personalization to provide better treatments. As one example, a laundry appliance has a chamber in which laundry items are placed for treatment. Sensor(s) are positioned to sense contents of the chamber or to sense the laundry items as they are loaded into the chamber. The machine learning model uses data from these sensors to determine various attributes of the laundry items and/or the treatment, such as the type of fabric and/or how dirty the items are, and the treatment process is controlled accordingly. Personalized data, such as an individual's preferences for laundry treatments or his sensitivities and allergies, may also be used to personalize the treatment process.

18 Claims, 8 Drawing Sheets

(56) References Cited

U.S. PATENT DOCUMENTS

| | | | |
|---|---|---|---|
| 2003/0115682 A1* | 6/2003 | Gardner | D06F 29/005 8/159 |
| 2009/0241271 A1* | 10/2009 | La Belle | D06F 39/003 8/159 |
| 2010/0205819 A1* | 8/2010 | Ashrafzadeh | D06F 58/04 34/380 |
| 2013/0160219 A1* | 6/2013 | Ashrafzadeh | D06F 33/02 8/137 |
| 2014/0018962 A1 | 1/2014 | Jung et al. | |
| 2017/0009390 A1* | 1/2017 | Suh | D06F 39/003 |
| 2018/0038041 A1* | 2/2018 | Longinotti-Buitoni | D06F 58/203 |
| 2018/0060937 A1 | 3/2018 | Shu et al. | |
| 2018/0066389 A1* | 3/2018 | Wu | G05B 19/042 |
| 2018/0196872 A1* | 7/2018 | Anglin | G06N 20/00 |

FOREIGN PATENT DOCUMENTS

| | | | |
|---|---|---|---|
| CN | 107090693 A | 8/2017 | |
| CN | 107354662 A | 11/2017 | |

\* cited by examiner

Input Data 250
- Sensor data 252
  - Surface
  - Images
- Individual data 255
  - None
- History data 257
  - Past washing

Attributes 260
- Item attributes 262
  - Item Type: Towels
  - Fabric Weight: Heavy
- Load attributes 265
  - Load size: Large

Settings 270
- Wash Mode: Towel
- Wash Temp: Hot
- Rinse Temp: Cold
- Spin Speed: High
- Detergent Level: High
- Water Level: High
- Fabric Softener: Yes

PERSONALIZED LAUNDRY APPLIANCE

BACKGROUND

1. Technical Field

This disclosure relates generally to control of laundry appliances, such as washing machines and dryers.

2. Description of Related Art

Washing machines and other types of laundry appliances are designed to treat many different types of items under many different conditions. Some items are very bulky, such as rugs, towels and bedding. Other items are very small or delicate, such as older heirloom items, silk or lace. The type of fabric can also affect the preferred settings for the laundry appliance. Heavy cotton items may take a long time to dry, compared to nylon or other synthetics. Some fabrics are more prone to shrinkage. Whether the laundry appliance is treating a full or partial load, and how soiled is the load, also affect the optimal settings.

The responsibility for selecting the best settings for a washing machine or dryer typically falls to the operator. For operators who are not experienced, this can be both intimidating and lead to poor results. In addition, state of the art laundry appliances often have many settings which casual operators may not know exist or may not know how to use to maximum benefit.

Thus, there is a need for more intelligent laundry appliances and for laundry appliances that allow more personalization.

SUMMARY

The present disclosure provides laundry appliances that use machine learning models to provide better automation and/or that allow more personalization. As one example, a laundry appliance has a chamber into which laundry items are placed for treatment. Sensor(s), for example touch sensors, spectral sensors, and so on, are positioned to obtain information about the laundry items, for example by sensing the interior of the chamber or its contents or by sensing the laundry items as they are loaded into the chamber. From this information, the machine learning model(s) determine various attributes of the laundry items and/or the treatment, such as the type of fabric or how dirty the items are, and the treatment process is controlled accordingly. The machine learning model(s) may be resident in the laundry appliance or it may be accessed via a network.

In another aspect, control of the laundry process is based on user inputs, individual user preferences or other personalized data, such as provided by or accessed from a personal smart phone. The laundry process may also be controlled based on temperature sensing and other sensor data, user usage history, historical performance data and other factors.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
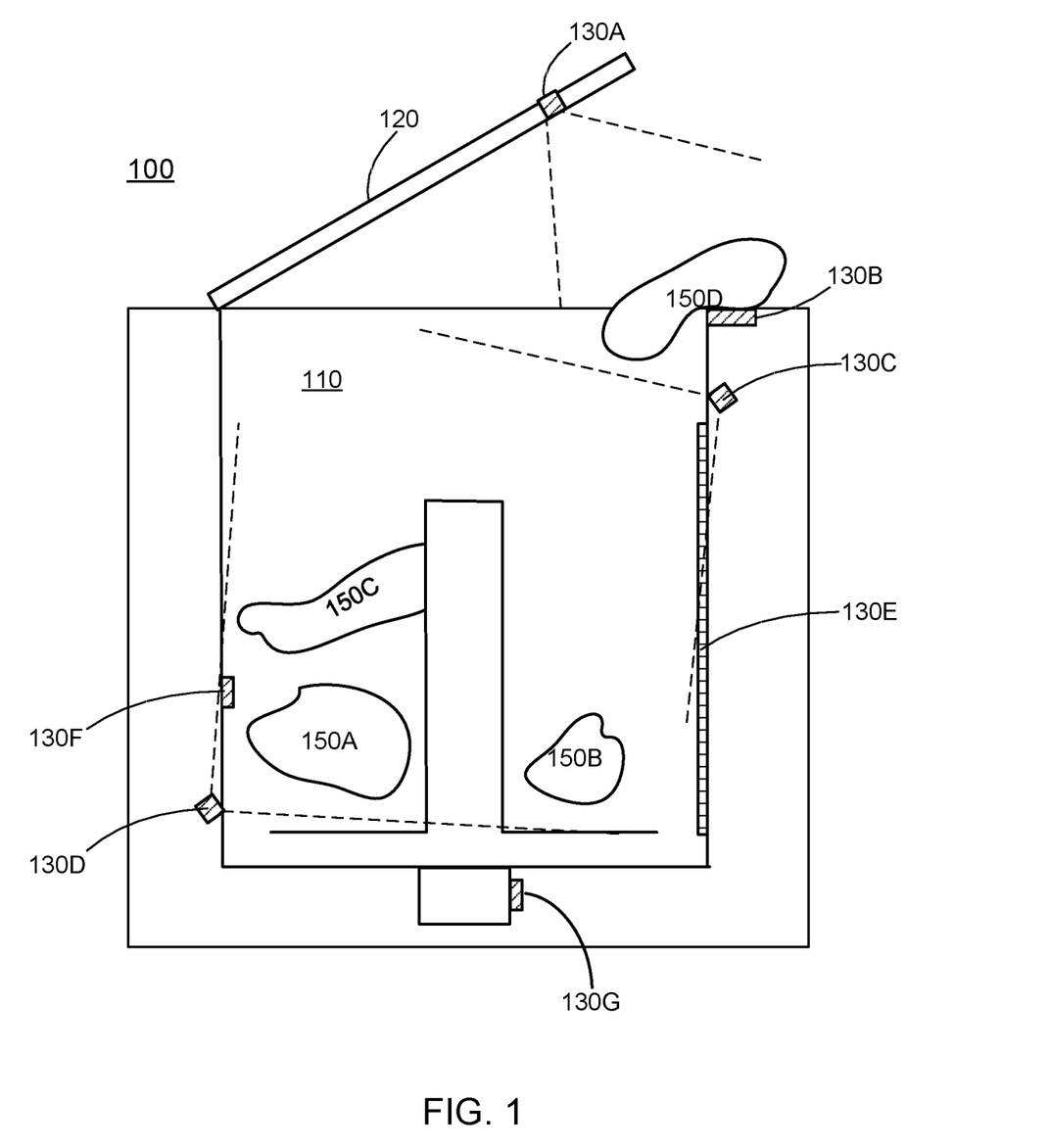
FIG. 1 is a cross-section of a side view of a washing machine, according to an embodiment.

FIG. 1 is a cross-section of a side view of a washing machine 100 according to an embodiment. The washing machine 100 includes a washing chamber 110 with a door 120. In this example, the washing machine is top-loading although it could also be front-loading. A load of laundry items 150 is placed in the chamber 110 for washing. Laundry items can include clothes, bedding, rugs, towels, etc. There can be other items in the chamber, such as the agitator shown in FIG. 1 or a drying rack in the case of a dryer. The size of the washing machine and the chamber 110 can vary: apartment, compact, regular-size, family-size, extra-large, commercial, industrial, etc. The size of the load can also vary. The washing machine may be run with a full or partial load. In FIG. 1, the washing machine 100 is shown with the lid 120 open as laundry items 150 are loaded into the washing chamber 110.

The washing machine 100 includes a group of one or more sensors 130 used to sense the load. In this example, a spectral sensor 130A is located in the lid 120 and captures spectral information about laundry items as they are loaded into the chamber. The sensor's field of view is shown by the dashed lines. Spectral sensors and cameras could also be positioned at other locations suitable for capturing images of laundry items during the loading process.

The sensor group also includes a tactile surface sensor 130B. A tactile surface sensor senses the surface of a laundry item through contact with the item. As one example, the tactile surface sensor registers an impression of the item contacting it. It has good resolution, typically on the order of microns, so that the fine grain of the fabric is resolved. In one approach, a camera captures images of the impressions, which are then processed to determine the fabric type. In FIG. 1, the tactile surface sensor 130B is located on a front lip of the washing machine. The laundry item 150D makes contact with and is sensed by the sensor 130B as it is being loaded into the washing machine. The operator may be given instructions to load the washing machine in a manner such that the laundry items 150 make contact with the tactile surface sensor 130B. For example, the operator may be instructed to press the laundry items against the tactile surface sensor 130B for proper operation.

The sensor group includes cameras 130C,130D positioned to capture images of laundry items in the chamber 110. These cameras 130 may be used before washing begins, for example during loading. They may also be used during the washing process or during specific phases of the washing process.

In this example, the cameras 130 are not directly exposed to the washing environment in the chamber. The lid 110 includes a window and the spectral sensor 130A is located behind the window. If the lid 110 is transparent, then it may be double-paned with the spectral sensor 130A located between the two panes of the window. The cameras 130C,D are also positioned behind windows. Top camera 130C may be in a location that is not exposed to water, detergent, etc. In this way, the cameras 130 are isolated from the washing environment, thus reducing possible damage.

If the lid 110 is transparent, it may include an optical coating to reduce ambient light into the washing chamber, thus enabling the cameras to capture better quality images. The optical coating can act like a one-way mirror, preventing ambient light from entering the chamber while still allowing the operator to see into the chamber. The washing chamber may also include special lighting to provide controlled lighting of the interior for the cameras. The cameras may be color, monochrome, infrared, etc. They may also have different resolutions depending on the intended task. For example, a camera used to identify individual articles of clothing will have higher resolution than a camera used only to sense whether the load is primarily colored or white.

The sensor group can include other types of sensors. Examples include temperature sensors, weight or volume sensors, pressure sensors, non-imaging optical sensors or spectral sensors, sensors for water level, pH sensors, etc. These sensors may be directly exposed to the washing environment, directly sensing the washing environment but not exposed to it, or indirectly sensing the washing environment.

For example, a water level sensor 130E may be a linear array of devices that are sensitive to exposure to water. By observing which sensors are exposed to water and which are not, the water level can be determined. A similar approach can be used to sense volume. By observing which sensors in a linear array are obscured by laundry items, the level of laundry items in the chamber can be determined. A pH sensor is another example which may be directly exposed to the washing environment. Cameras and other optical sensors are examples of sensor that typically will directly sense the washing environment but are not exposed to it. Non-imaging optical sensors may be used to sense color. Some types of temperature sensors may also fall into this category. The weight of the overall load may be sensed indirectly, for example by a pressure sensor that responds to the overall weight of the chamber or by measuring the torque required to spin the load and chamber at a certain rotational speed. In FIG. 1, sensor 130G measures the torque produced by the bottom motor.

The sensors 130 do not have to be incorporated as part of the washing machine. For example, they could be implemented as an accessory to the washing machine. If the goal is to identify individual laundry items using more complex sensing, a separate accessory with a combination of tactile surface sensors, cameras and other sensors in a controlled arrangement may be useful. As another example, the sensors 130 in washing machine 100 may capture sensor data that is then provided to a dryer for subsequent drying of the same laundry items. In that scenario, some of the sensor data used by the dryer does not come from sensors on the dryer itself.

Figure 2A:
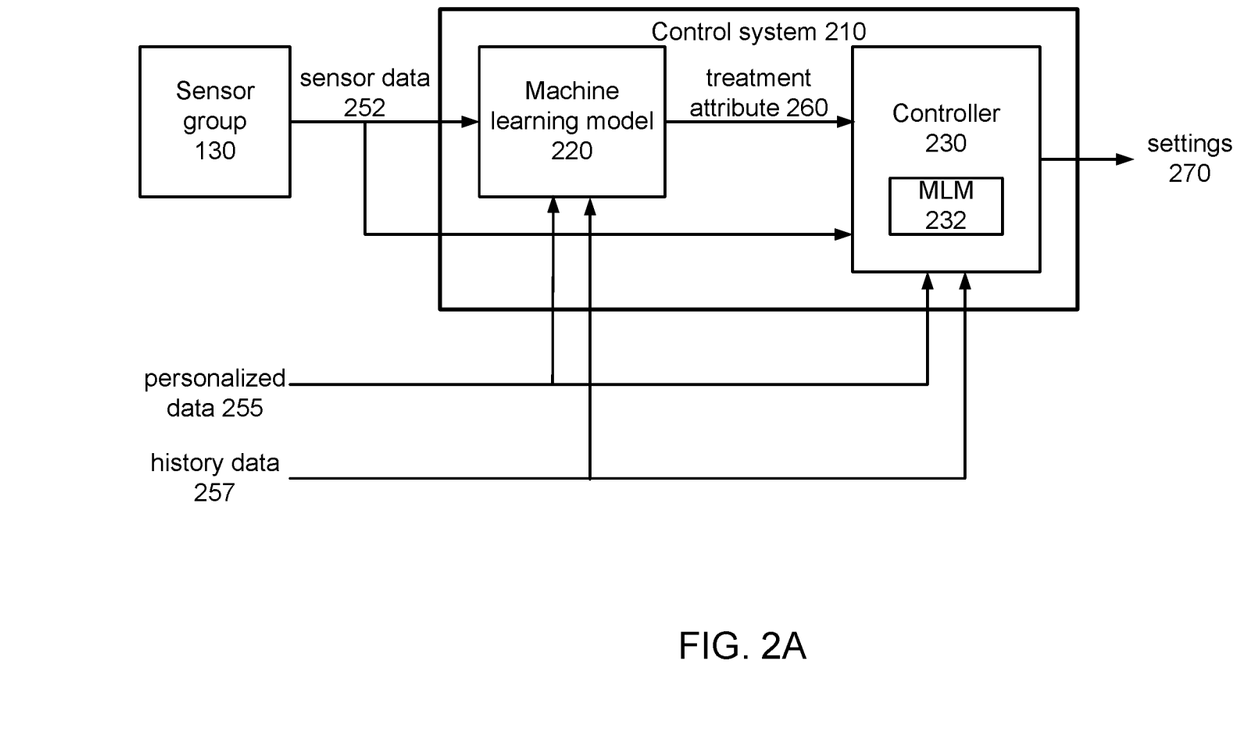
FIG. 2A is a block diagram illustrating control of a washing machine, according to an embodiment.

FIG. 2A is a block diagram illustrating control of a laundry appliance, such as the washing machine 100. The control system 210 is roughly divided into a machine learning model 220 and a controller 230. The controller 230 may (or may not) also include machine learning 232. The machine learning model 220 receives sensor data 250 captured by some or all of the sensors 130. From these inputs (possibly in combination with other additional inputs such as personalized data 255 or historical data 257), the machine learning model 220 determines various attributes 260 related to treatment of the load by the laundry appliance. The controller 230 generates setting(s) 270 for the laundry appliance based on the treatment attributes 260 from the machine learning model 220.

Personalized data 255 for one or more individuals associated with the laundry items and historical data 257 may also be considered to generate the settings 270, which may be personalized for individuals. For example, some individuals may prefer more softening, others may prefer faster or more efficient washing, and yet others may prefer more automatic wrinkle removal or steam treatment. These personalized preferences may be provided directly by individuals, for example as stored in personal profiles or provided by individuals through smart phones or other devices. They may also be learned over time, based on historical settings or feedback from individuals on the results of prior treatments.

The individual is identified in order to determine how to personalize the treatment process. The individual may be identified when he logs into his user account for the laundry equipment or for a home network connected to the laundry equipment. Alternately, the individual may be identified by face recognition or other techniques.

Sensor data 250 may also be directly used by the controller 230 to generate the settings 270. The controller 230 controls the laundry appliance to treat the load according to the settings 270.

Typically, a machine learning model 220 is used for more complex relationships between sensor data 250, possibly personalized data 255, and treatment attributes 260. One example is if the sensor data 250 is captured images. A machine learning model 220 may be used to predict fabric type, fabric weight, type of laundry items, size of the laundry items, how soiled the laundry items are, color mix for the load and/or to identify specific laundry items from captured images. These are problems well-suited for machine learning and difficult to accomplish using more conventional techniques. Table I lists some examples of treatment attributes. These can be attributes of individual laundry items or of the load as a whole.

TABLE I

Examples of treatment attributes

| Attribute | Different Values |
|---|---|
| Fabric Type | Cotton |
| | Denim |
| | Silk |
| | Linen |
| | Wool |
| | Leather |
| | Ramie |
| | Hemp |
| | Jute |
| | Cotton voile |
| | Polyester - nylon, rayon |
| | Velvet, taffeta |
| | Cotton-Poly Blend |
| | Delicates |
| | Water-proof - plastic, rubber |

TABLE I-continued

Examples of treatment attributes

| Attribute | Different Values |
|---|---|
| | Satin |
| | Double gauze |
| | Chambray |
| | Synthetics - acetate, chiffon, acrylic, organza, lastex |
| Fabric weight | Extra heavy - heavy towels, heavy flannel, water-absorbing fabrics |
| | Heavy - heavy denim, light towels |
| | Normal |
| | Light |
| Type of laundry items | Heavy Clothes - work clothes, heavy denim, sweaters and jackets |
| | Regular Clothes - shirts, blouses, pants, skirts, dresses |
| | Underwear - including socks |
| | Towels |
| | Large or Bulky - blankets, rugs, heavy bedding, comforters, sleeping bags |
| Size of laundry items | Extra Large - one item per load |
| | Large - a few items per load |
| | Normal |
| Soil level | Extra Heavy - soiled work clothes, underwear or diapers |
| | Heavy - dirtier than normal, but not Extra Heavy |
| | Normal |
| | Light |
| Color mix | Dark Colors |
| | Mixed |
| | Light Colors |
| | Whites |

The machine learning model 220 may also use other data as inputs to predict these treatment attributes. Surface information from a surface sensor, and more conventional sensor data such as color or weight could be used as additional inputs to the machine learning model 220. Data from sources other than the sensor group 130 can also be used as inputs to the machine learning model. Examples include the personalized data described below.

The controller 230 determines the settings 270 for the laundry appliance based on the treatment attributes and optionally also based on other data, such as personalized data 255 or historical data 257. Personalized data is data for one or more individuals associated with the laundry items. Typically, the individual will be either the user of the laundry item (e.g., the person who wears the clothes) or the operator who is using the laundry appliance to treat the laundry items. If the laundry items are clothes and the individual is the wearer of the clothes, then the personalized data might include the wearer's sensitivities or allergies, the wearer's medical conditions or the wearer's preferences for treating his clothes. Some individuals may prefer more softening, for example. In this way, the laundry treatment can be personalized to individuals. This information may be obtained from a user profile that is accessible by the laundry appliance. It may also be obtained from other sources, such as from third party websites.

Examples of history data 257 include the appliance's past history of operation and treatment history of individual laundry items. For example, a washing machine may have always been operated in a mode that conserves water, or always with hot wash cycle for whites and warm wash cycle for colors. Certain laundry items may require special treatment, which may be determined from their prior treatments.

In any event, the controller 230 determines the appropriate settings 270 for the laundry appliance. Examples of settings 270 include a temperature of the treatment performed by the laundry appliance, a duration of the treatment, a load level for the treatment, a gentleness of the treatment, an economy setting for the treatment, a spin speed for the treatment, an amount of detergent used for the treatment, and an amount of water used for the treatment.

Laundry appliances often can be operated in different treatment modes, often referred to as different wash cycles or different drying cycles. The controller 230 may select an appropriate treatment mode based on the treatment attributes determined by the machine learning model. As yet another example, the treatment itself may have different phases. The controller 230 may select when to transition between different phases based on the personalized data and on the treatment attributes determined by the machine learning model.

Table II below lists some examples of different settings for a washing machine.

TABLE II

Washing machine settings

| Variable | Different Settings |
|---|---|
| Wash Mode | Normal - Recommended for all "normal" loads, except delicate fabrics. Good for cotton, linen, shirts, jeans, mixed loads. |
| | Normal with PreWash - Same as Normal mode, but applies immediate pretreatment to prevent stains from setting. |
| | Heavy Duty - Recommended for heavily soiled items, especially cotton. |
| | Light - For small or lightly-soiled loads. |
| | Bedding - Recommended for large, bulky items: blankets, comforters, sheets, rugs. |
| | Towels - Recommended for towels: bath towels, beach towels. |
| | Sanitary - Applies high temperatures to reduce bacteria. Better for white fabrics. Not recommended for temperature-sensitive items. |
| | Super-Sanitary - Uses powerful washing action and high temperatures. Recommended for heavily soiled underwear, work clothes, diapers. Not recommended for temperature-sensitive or delicate items. |
| | Whites - Designed for white-only loads. |
| | Perm Press - Designed to reduce wrinkles. Recommended for dress shirts, dress pants, wrinkle-free clothing, poly-cotton blend, wrinkle-free tablecloths. |
| | Waterproof - Recommended for waterproof items: plastic mats, mattress covers, water resistant clothing. |
| | Delicates - Recommended for delicate items: delicate fabrics, lingerie, sheer or lacy garments. |

TABLE II-continued

Washing machine settings

| Variable | Different Settings |
|---|---|
| Wash temperature | Extra hot<br>Hot<br>Warm<br>Cold |
| Rinse temperature | Warm<br>Cold |
| Spin speed | Extra high<br>High<br>Medium<br>Low<br>No spin |
| Soil level | Heavy<br>Medium - heavy<br>Medium<br>Medium - light<br>Light |
| Wash Mode Options | Pre-soak - Soak laundry items before starting rest of wash cycle.<br>Stain handling - Special stain treatment.<br>Rinse + spin - Perform only rinse and spin cycles.<br>Spin only - Perform only spin cycle.<br>Steam - Add steam treatment to wash cycle.<br>Cold wash - Use only cold temperature wash, but increase wash time.<br>Speed wash - Decrease wash time but with same wash effectiveness.<br>Delay wash - Delay start of wash cycle.<br>Fabric softener - Dispense fabric softener.<br>Extra rinse - Add extra rinse cycle.<br>Extra water - Add extra water to wash cycle. |

Table III below lists some examples of different settings for a dryer.

TABLE III

Dryer settings

| Variable | Different Settings |
|---|---|
| Drying Modes | Normal - Recommended for all "normal" loads. Good for normal-weight cotton, linen, shirts, mixed loads.<br>Heavy - Recommended for loads with heavier items. Good for jeans, other heavyweight items.<br>Light - For small loads or loads with easy-to-dry items.<br>Air Dry - Drying without heat, such as for plastic or rubber items.<br>Bedding - Recommended for large, bulky items: blankets, comforters, pillows, rugs.<br>Towels - Recommended for towels, heavy cotton, heavy denim.<br>Perm. Press - Recommended for permanent press, synthetic fabrics.<br>Delicates - Recommended for delicate items: delicate fabrics, lingerie, sheer or lacy garments.<br>Steam Fresh - Adds steam cycle to reduce wrinkles.<br>Sanitary - Applies high temperatures to reduce bacteria. |
| Drying Level | Very dry<br>More dry<br>Normal<br>Less dry<br>Damp dry |
| Temperature | High<br>Medium - high<br>Medium<br>Low<br>Ultra-low<br>No heat |
| Time Dry | Operator selects time |
| Mode Options | Steam - Add steam cycle to drying cycle.<br>Sanitary - Add high temperature cycle to reduce bacteria.<br>Wrinkle reduction - After drying cycle is done, periodically run short steam cycle to reduce wrinkles.<br>Reduce static - Run short steam cycle to reduce static buildup. |

FIGS. 2B-2E provide some specific examples. Each of these examples lists the type of input data 250 used, including sensor data 252, personalized data 255 and historical data 257. These are translated into attributes 260, possibly for individual laundry items 262 or for the load as a whole 265. The resulting settings 270 are also shown.

Figure 2B:
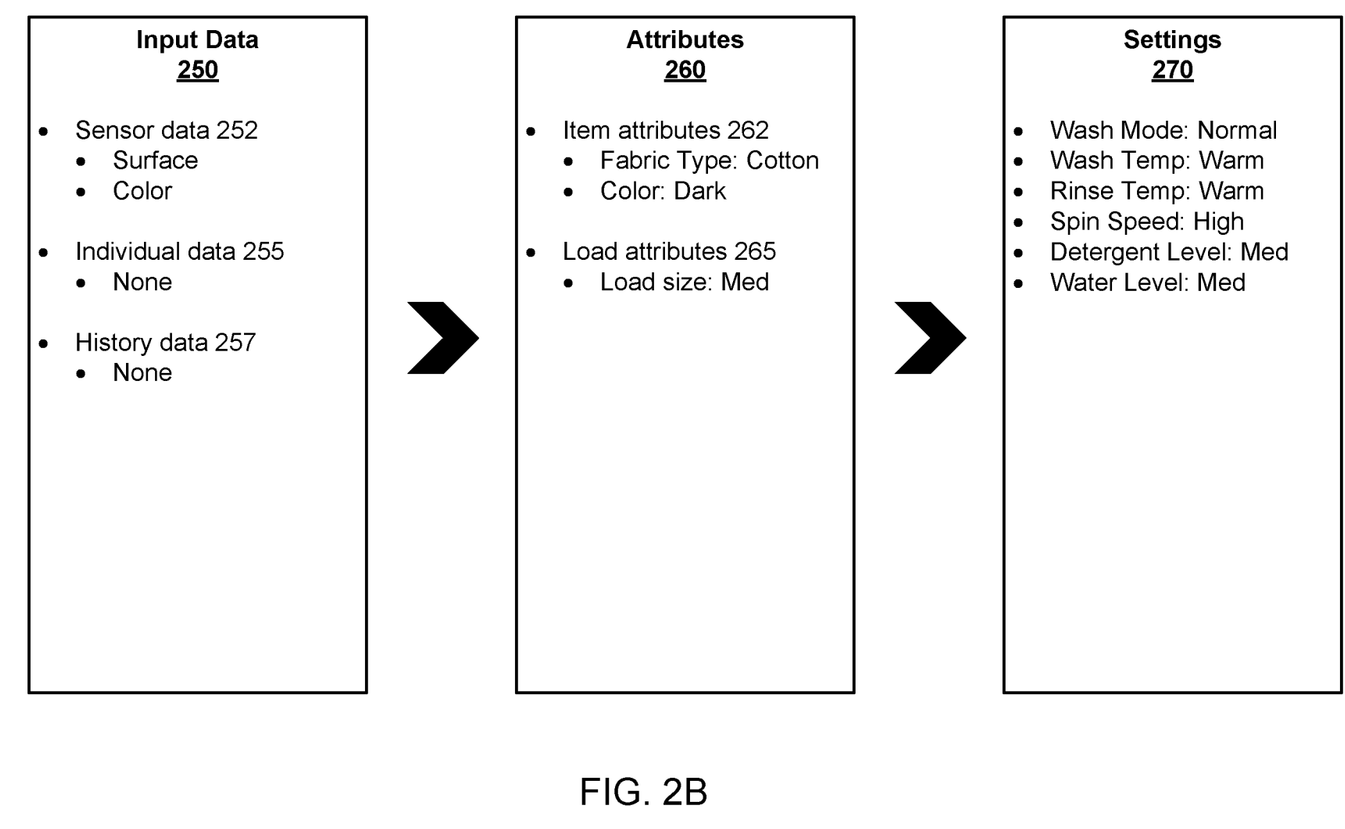
FIGS. 2B-2E provide some specific examples of controlling a washing machine, according to an embodiment.

In FIG. 2B, a surface sensor in conjunction with the machine learning model determines that most laundry items are cotton. A camera or spectral sensor detects that the load is mostly dark colors. An optical sensor determines that the washing chamber is only partially filled. No individual data 255 or historical data 257 is used. As a result, the controller generates settings for a partial load of dark color cotton items. Normal wash cycle is used, with warm wash and rinse temperatures and high spin speed. Medium levels of detergent and water are used, and there are no special options used.

Figure 2C:
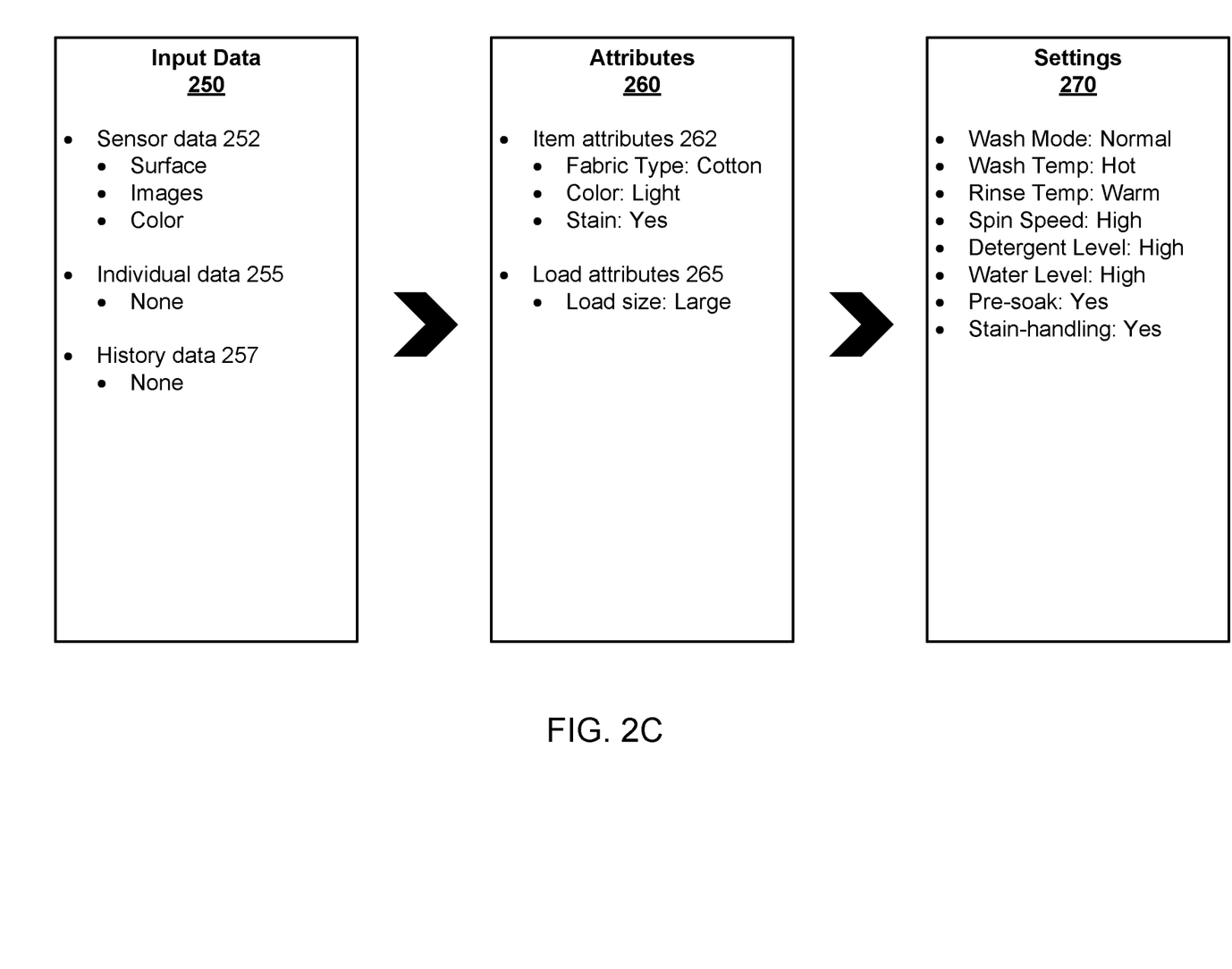

FIG. 2C is similar to FIG. 2B except that the load is primarily light colors instead of dark colors. In addition, the machine learning model detects a stain on one of the items, possibly from wine, grape juice, tomato sauce or blood. As a result, hot temperature is used for the wash cycle, the load is pre-soaked before the regular wash cycle begins, and the stain-handling option is turned on.

Figure 2D:
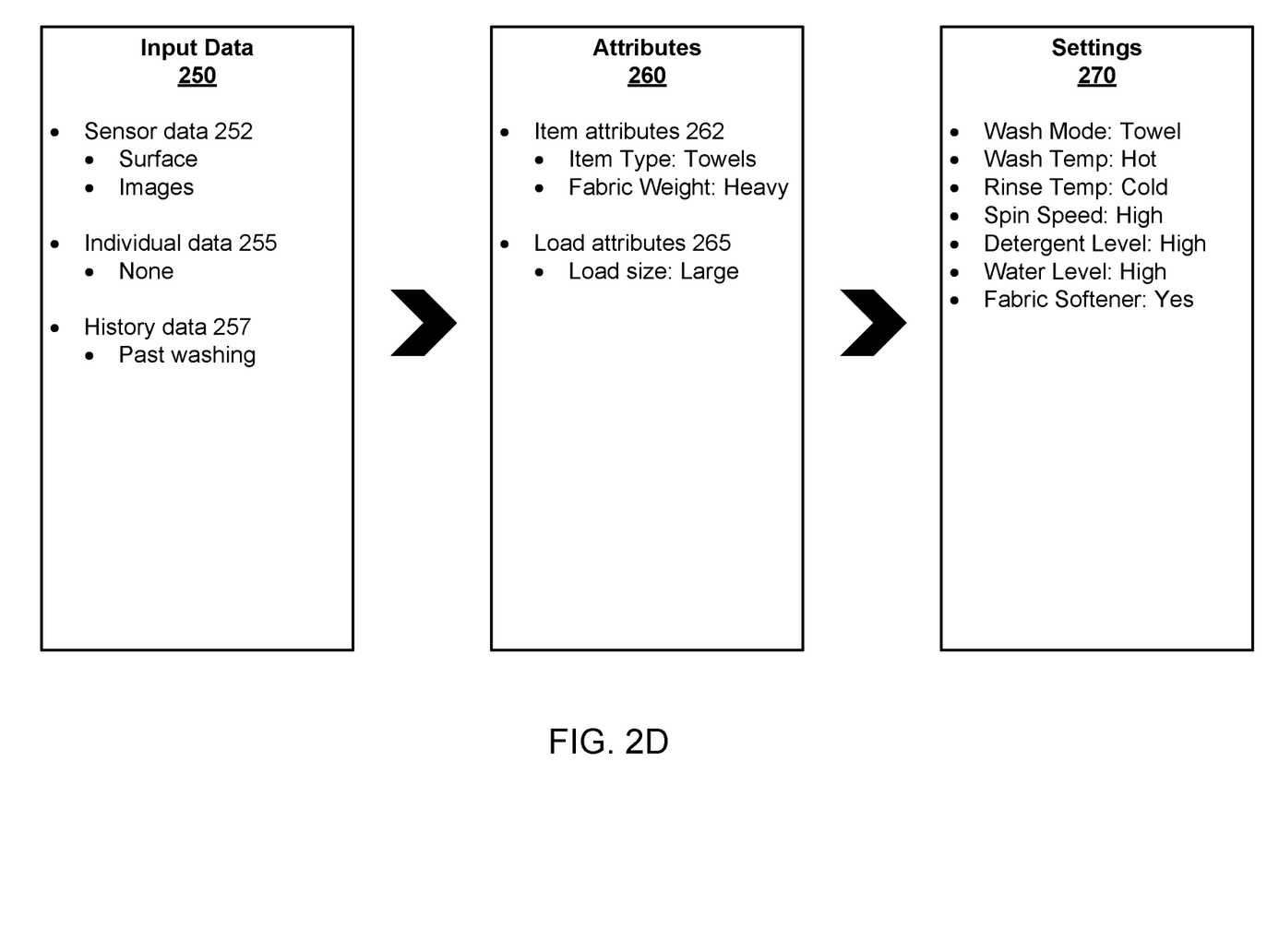

In FIG. 2D, the machine learning model detects a load of towels from the captured images. The surface sensor indicates these are heavier weight towels. As a result, the washing machine is set to the towel wash cycle. In addition, past washings of heavier weight towels have typically used fabric softener, so the fabric softener option is also automatically selected.

Figure 2E:
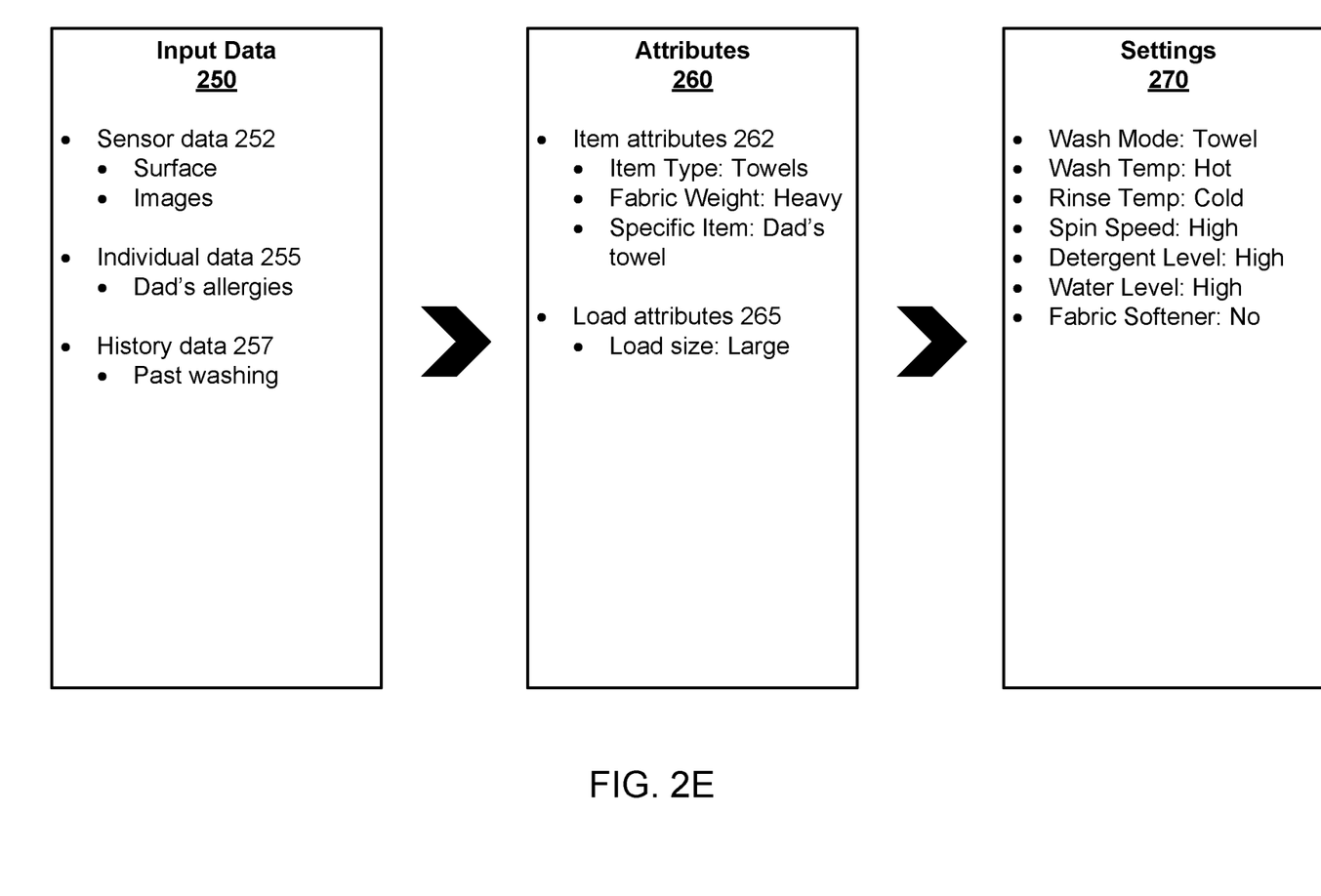

In FIG. 2E, one of the towels is recognized as Dad's beach towel, possibly from the distinctive color or pattern on the towel. However, Dad is allergic to fabric softener, so the fabric softener option is not selected. In this example, the machine learning model identified a specific laundry item. In that case, treatment instructions for that specific item can be used to generate the settings. For example, the manufacturer's instructions may be consulted to determine appropriate settings. Alternately, individuals may provide specific instructions for important laundry items, either expressly or implicitly based on prior treatments of the laundry item or similar laundry items.

Figure 3:
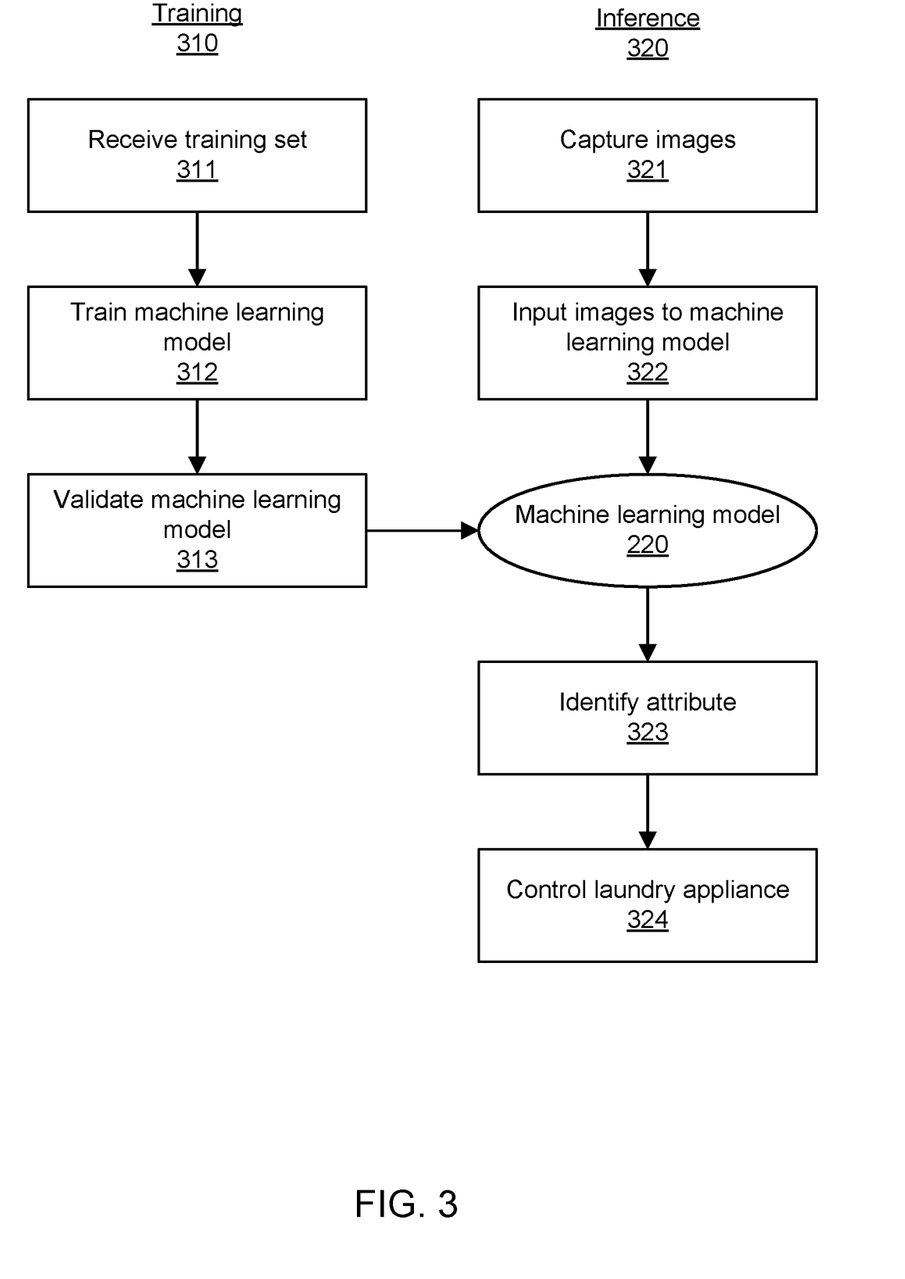
FIG. 3 is a flow diagram illustrating training and operation of a machine learning model, according to an embodiment.

FIG. 3 is a flow diagram illustrating training and operation of a machine learning model 220, according to an embodiment. The process includes two main phases: training 310 the machine learning model 220 and inference (operation) 320 of the machine learning model 220. These will be illustrated using an example where the machine learning model learns to predict fabric type based on captured images.

A training module (not shown) performs training 310 of the machine learning model 220. In some embodiments, the machine learning model 220 is defined by an architecture with a certain number of layers and nodes, with biases and weighted connections (parameters) between the nodes. During training 310, the training module determines the values of parameters (e.g., weights and biases) of the machine learning model 220, based on a set of training samples.

The training module receives 311 a training set for training. The training samples in the set includes images captured by the camera(s) 130 for many different situations: different laundry items and fabric types, different colors and variations of the same fabric type, different load levels, different positions of the laundry items in the chamber, different lighting conditions; etc. For supervised learning, the training set typically also includes tags for the images. The tags include the treatment attribute to be trained: fabric type in this example.

In typical training 312, a training sample is presented as an input to the machine learning model 220, which then produces an output for a particular treatment attribute. The difference between the machine learning model's output and the known good output is used by the training module to adjust the values of the parameters in the machine learning model 220. This is repeated for many different training samples to improve the performance of the machine learning model 220.

The training module typically also validates 313 the trained machine learning model 220 based on additional validation samples. For example, the training module applies the machine learning model 220 to a set of validation samples to quantify the accuracy of the machine learning model 220. The validation sample set includes images and their known attributes. The output of the machine learning model 220 can be compared to the known ground truth. Common metrics applied in accuracy measurement include Precision=TP/(TP+FP) and Recall=TP/(TP+FN), where TP is the number of true positives, FP is the number of false positives and FN is the number of false negatives. Precision is how many outcomes the machine learning model 220 correctly predicted had the target attribute (TP) out of the total that it predicted had the target attribute (TP+FP). Recall is how many outcomes the machine learning model 220 correctly predicted had the attribute (TP) out of the total number of validation samples that actually did have the target attribute (TP+FN). The F score (F-score=2*Precision*Recall/(Precision+Recall)) unifies Precision and Recall into a single measure. Common metrics applied in accuracy measurement also include Top-1 accuracy and Top-5 accuracy. Under Top-1 accuracy, a trained model is accurate when the top-1 prediction (i.e., the prediction with the highest probability) predicted by the trained model is correct. Under Top-5 accuracy, a trained model is accurate when one of the top-5 predictions (e.g., the five predictions with highest probabilities) is correct.

The training module may use other types of metrics to quantify the accuracy of the trained model. In one embodiment, the training module trains the machine learning model until the occurrence of a stopping condition, such as the accuracy measurement indication that the model is sufficiently accurate, or a number of training rounds having taken place.

Training 310 of the machine learning model 220 can occur off-line, as part of the product development for the laundry appliance. The trained model 220 is then installed on the laundry appliance sold to consumers. The laundry appliance can execute the machine learning model using fewer computing resources than is required for training. In some cases, the machine learning model 220 is continuously trained 310 or updated. For example, the training module uses the images captured by the camera 130 in the field to further train the machine learning model 220. Because the training 310 is more computationally intensive, it may be cloud-based or occur on a separate home device with more computing power. Updates to the machine learning model 220 are distributed to the laundry appliance.

In operation 320, the machine learning model 220 uses the images captured 321 by the camera 130 as input 322 to the machine learning model 220. In one architecture, the machine learning model 220 calculates 323 a probability of possible different outcomes, for example the probability that the fabric types is cotton, that the fabric types is cotton-poly blend, that the fabric types is polyester, etc. Based on the calculated probabilities, the machine learning model 220 identifies 323 which attribute is most likely. For example, the machine learning model 220 might identify that cotton is the most likely fabric type. In a situation where there is not a clear cut winner, the machine learning model 220 may identify multiple attributes and ask the user to verify. For example, it might report that cotton and cotton-poly blend are both likely, with the user verifying that the laundry item is cotton. The controller 230 then controls 324 the laundry appliance based on the identified attributes.

Figure 4:
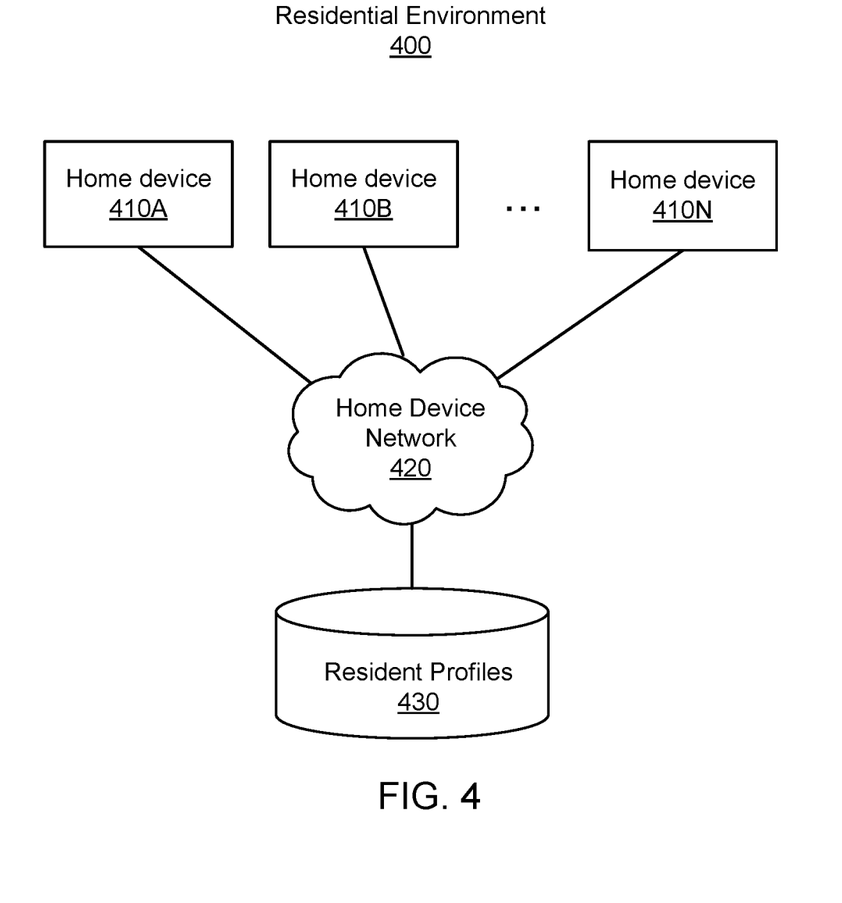
FIG. 4 is a block diagram of a residential environment including a laundry appliance, according to an embodiment.

In another aspect, the laundry appliance may be part of a home network. FIG. 4 is a block diagram of a residential environment that includes laundry appliance, according to an embodiment. The residential environment 400 is an environment designed for people to live in. The residential environment 400 can be a dwelling, such as a house, a condo, an apartment, or a dormitory. The residential environment 400 includes home devices 410A-N, including the laundry appliance described above. It also includes a home device network 420 connecting the home devices 410, and a resident profiles database 430 that contains residents' preferences for the home devices. The components in FIG. 4 are shown as separate blocks but they may be combined depending on the implementation. For example, the resident profiles 430 may be part of the home devices 410. Also, the residential environment 400 may include a hub for the network 420. The hub may also control the home devices 410. The network 420 may also provide access to external devices, such as cloud-based services.

The home devices 410 are household devices that are made available to the different persons associated with the residential environment 400. Examples of other home devices 410 include HVAC devices (e.g., air conditioner, heater, air venting), lighting, powered window and door treatments (e.g., door locks, power blinds and shades), powered furniture or furnishings (e.g., standing desk, recliner chair), audio devices (e.g., music player), video device (e.g., television, home theater), environmental controls (e.g., air filter, air freshener), kitchen appliances (e.g., rice cooker, coffee machine, refrigerator), bathroom appliances, and household robotic devices (e.g., vacuum robot, robot butler). The home devices 410 can include other types of devices that can be used in a household.

The resident profiles 430 typically include information about the different residents, such as name, an identifier used by the system, age, gender, and health information. The resident profiles 430 can also include settings and other preferences of the home devices 410 selected by the different residents.

The network 420 provides connectivity between the different components of the residential environment 400 and allows the components to exchange data with each other. The term "network" is intended to be interpreted broadly. It can include formal networks with standard defined protocols, such as Ethernet and InfiniBand. In one embodiment, the network 420 is a local area network that has its network appliance and interconnects managed within the residential environment 400. The network 420 can also combine different types of connectivity. It may include a combination of local area and/or wide area networks, using both wired and/or wireless links. Data exchanged between the components may be represented using any suitable format. In some embodiments, all or some of the data and communications may be encrypted.

The functionality described above can be physically implemented in the individual laundry appliance (one of the home devices 410), in a central hub for the home network, in a cloud-based service or elsewhere accessible by the laundry appliance via the network 420.

Although the detailed description contains many specifics, these should not be construed as limiting the scope of the invention but merely as illustrating different examples. It should be appreciated that the scope of the disclosure includes other embodiments not discussed in detail above. For example, although an washing machine is used as the primary example, other laundry appliance can also be used. These include all varieties of washing machines, dryers, and steamers. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A system for generating a setting for laundry appliance that treats a load of laundry items, the system comprising:
a sensor group associated with the laundry appliance, the sensor group comprising one or more sensors that capture sensor data for one or more laundry items in the load, wherein the sensor group includes a tactile surface sensor that senses a surface of one or more laundry items through contact with the laundry item when the laundry item is pressed against the tactile surface sensor during loading of the laundry item into the laundry appliance, and wherein the tactile surface sensor is located on a front lip of the laundry appliance and the laundry item makes contact with and is sensed by the tactile surface sensor when moving across the front lip of the laundry appliance into a chamber of the laundry appliance;
a machine learning model that receives the sensor data and determines, based on the sensor data, a treatment attribute related to the treatment of the load by the laundry appliance, wherein the sensor data includes surface characteristics of the laundry item captured by the tactile surface sensor; and
a controller that generates a setting for the laundry appliance based on the treatment attribute determined by the machine learning model and controls the laundry appliance to treat the load according to the generated setting, wherein the laundry appliance is a dryer for drying laundry items, and the controller further obtains data from a washer that has previously treated the laundry items, including washing the laundry items, and the setting used by the dryer for drying the laundry items is generated further based on the data from the washer used to washing the laundry items.

2. The system of claim 1, wherein the machine learning model further receives personalized data for one or more individuals associated with the laundry items, and determines the treatment attribute further based on the personalized data.

3. The system of claim 1, wherein the machine learning model further receives history data associated with the laundry appliance and/or the laundry items, and determines the treatment attribute further based on the history data.

4. The system of claim 1, wherein the sensor group includes a camera that captures images of one or more laundry items, and the machine learning model determines the treatment attribute based on the captured images.

5. The system of claim 1, wherein the treatment attribute determined by the machine learning model includes one of fabric type, size of the laundry items, size of the load, and soiled level of the load.

6. The system of claim 1, wherein the machine learning model identifies one of the laundry items based on the sensor data, and the controller generates the setting based on the identified laundry item.

7. The system of claim 6, wherein the setting for the laundry appliance is generated based in part on at least one of: treatment instructions for the identified laundry item, and prior treatments of the identified laundry item by the laundry appliance.

8. The system of claim 6, wherein the setting for the laundry appliance is generated based in part on an personalized preference for treating the identified laundry item.

9. The system of claim 1, wherein the machine learning model is implemented remotely from the laundry appliance.

10. The system of claim 1, wherein the controller further obtains personalized data for one or more individuals associated with the laundry items, and the setting for the laundry appliance is generated further based on the individualized data.

11. The system of claim 10, wherein the individual associated with the laundry items is a user of the laundry items and the personalized data includes one of: the user's sensitivities or allergies, the user's medical conditions, or the user's preferences for laundry treatments.

12. The system of claim 10, wherein the personalized data is obtained from the individual's profile accessible by the laundry appliance.

13. The system of claim 10, wherein the personalized data is obtained from a smart phone or other personal computing device operated by the individual.

14. The system of claim 10, wherein the personalized data is obtained from third party websites.

15. The system of claim 1, wherein the controller comprises a second machine learning model that generates the setting for the laundry appliance.

16. The system of claim 1, wherein the treatment attribute is personalized to an individual associated with the laundry items.

17. The system of claim 1, wherein the setting is personalized to an individual associated with the laundry items.

18. A method for generating a setting for laundry appliance that treats a load of laundry items, the method comprising:

capturing sensor data for one or more laundry items in the load, wherein the sensor group includes a tactile surface sensor that senses a surface of one or more laundry items through contact with the laundry item when the laundry item is pressed against the tactile surface sensor during loading of the laundry item into the laundry appliance, and wherein the tactile surface sensor is located on a front lip of the laundry appliance and the laundry item makes contact with and is sensed by the tactile surface sensor when moving across the front lip of the laundry appliance into a chamber of the laundry appliance;

applying the captured sensor data as input to a machine learning model that determines a treatment attribute related to the treatment of the load by the laundry appliance, wherein the sensor data includes surface characteristics of the laundry item captured by the tactile surface sensor;

generating a setting for the laundry appliance based on the treatment attribute determined by the machine learning model; and causing the laundry appliance to treat the load according to the generated setting, wherein the laundry appliance is a dryer for drying laundry items, and the method further comprises obtaining data from a washer that has previously treated the laundry items, including washing the laundry items, and the setting used by the dryer for drying the laundry items is generated further based on the data from the washer used to washing the laundry items.

* * * * *